US009898214B2

(12) United States Patent
Hanif et al.

(10) Patent No.: US 9,898,214 B2
(45) Date of Patent: Feb. 20, 2018

(54) STORAGE SITE SELECTION IN A MULTI-TARGET ENVIRONMENT USING WEIGHTS

(71) Applicant: International Business Machines Corporation, Armonk, NY (US)

(72) Inventors: Tariq Hanif, Lagrangeville, NY (US); William J. Rooney, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 14/869,222

(22) Filed: Sep. 29, 2015

(65) Prior Publication Data
US 2017/0090787 A1    Mar. 30, 2017

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |

(52) U.S. Cl.
CPC ............ G06F 3/0619 (2013.01); G06F 3/067 (2013.01); G06F 3/0665 (2013.01); G06F 3/0689 (2013.01); G06F 3/065 (2013.01); G06F 3/0683 (2013.01)

(58) Field of Classification Search
CPC ...... G06F 3/0619; G06F 3/067; G06F 3/0689; G06F 3/0665; G06F 3/0683; G06F 3/065
USPC ......................................... 711/161, 162, 114
See application file for complete search history.

(56) References Cited

U.S. PATENT DOCUMENTS

| | | |
|---|---|---|
| 8,549,242 B2 | 10/2013 | Blea et al. |
| 2014/0019802 A1 | 1/2014 | Rooney et al. |
| 2014/0122816 A1 | 5/2014 | Barnes et al. |
| 2015/0378626 A1* | 12/2015 | Motwani ................. G06F 3/067 |
| | | 711/114 |

OTHER PUBLICATIONS

Frank Kyne, et al.:"Achieving the Highest Levels of Parallel Sysplex Availability"; Redbook; Dec. 2004; pp. 294.
Werner Bauer, et al.: "IBM DS8000 and z/Os Basic HyperSwap"; Redpaper; 2008; pp. 38.
Pierre Cassier, et al.: "Z/OS Parallel Sysplex Configuration Overview"; Redbooks; International Technical Support Orginazation, Sep. 2006; pp. 340.

* cited by examiner

*Primary Examiner* — Mark Giardino, Jr.
*Assistant Examiner* — Shane Woolwine
(74) *Attorney, Agent, or Firm* — Cantor Colburn LLP; William A. Kinnaman, Jr.

(57) ABSTRACT

A method, computer program product, and/or system for performing a selection of a plurality of auxiliary storage sites in a multi-target environment in preparation for a hyper exchange are/is provided. To perform the selection, a failure is first detected with respect to a primary storage site in the multi-target environment. Then, aggregate weights are determined based on a management policy for the plurality of auxiliary storage sites. In turn, an auxiliary storage site with a first aggregate weight is selected from the plurality of auxiliary storage sites. With the auxiliary storage site selected, the hyper exchange of a plurality of systems in a multi-target environment in response to the failure is triggered from the primary storage site to the auxiliary storage site with the first aggregate weight.

14 Claims, 5 Drawing Sheets

STORAGE SITE SELECTION IN A MULTI-TARGET ENVIRONMENT USING WEIGHTS

BACKGROUND

The present disclosure relates generally to multi-target environments and more specifically, to storage site selection in a multi-target environment using weights.

In general, contemporary multi-target systems provide a continuous availability solution for disks using selection and exchange operations. Selection and exchange operations are designed to eliminate disk failures as a source of application outages by allowing customers to specify a set of storage volumes to be synchronously mirrored. That is, in the event of a permanent input/output (I/O error) on a primary disk, I/O requests are automatically switched to a secondary disk, thereby masking the failure from an application (or system) and eliminating a need to restart the application after the failure. Selection and exchange operations can also be used to initiate a planned swap to the secondary disk to perform required maintenance on the primary disk.

The contemporary designs of selection and exchange operations support swapping between two storage sites only. So, if an unplanned selection and exchange trigger occurred due to a permanent I/O error on a primary storage site, applications would start using the secondary storage site. Depending on the cause of the I/O error on the primary storage site, delays can be experienced while identifying the cause of the selection and exchange, rectifying the problem, and/or re-establishing a synchronous mirroring relationship between the primary and secondary storage sites. During this time, the customer is exposed to a subsequent disk failure. Some customers further protect their data by creating a three site solution. In this case they synchronously mirror from site 1 to site 2, and then asynchronously mirror from site 2 to site 3. However site 3 cannot receive an exchange since this replication is asynchronous and therefore is not an identical copy of site 1 or site 2. In addition, asynchronous replication will expose the customer to the possibility of some data updates being lost.

Contemporary multi-target storage replication (contemporary replication) includes maintaining selection and exchange capability after an exchange. For example, the contemporary replication can include the ability to have a preferred site to switch over to in the event of an unplanned selection and exchange and the ability to move to the third site in the case the preferred site is not viable for a selection and exchange. In general, a target site is considered to be viable only if all members of a contemporary sysplex remain capable of accessing all of the target volumes. If even one system in these systems is unable to access even a single volume, it is considered non-viable. In this case, selection and exchange will attempt to switch to the less preferred (tertiary) site, if switching to that site will result in all systems in the contemporary sysplex maintaining access to all volumes. Further, contemporary replication systems fail to detail how to select a site to switch to in the case that none of the two (or more) potential targets provide an environment where all volumes are currently accessible by all systems in the contemporary sysplex. What the contemporary replication does in this case, based on customer policy, is either abort the selection and exchange or attempt it using the preferred target. In this case, at least one system in the contemporary sysplex is likely to fail or at least have some of its applications fail. It takes only the relative preference of the target storage site into account (e.g. the one that is most geographically close to the servers). It does not take into account the importance of the workload running on the servers.

For example, when swapping to either storage site will likely result in the failure of some server, the contemporary sysplex will switch to the preferred storage target, but does not consider that one storage site may allow a server running the most business critical work to continue, while a server running discretionary work would fail.

SUMMARY

Embodiments include a method, system, and computer program product for performing a selection of a plurality of auxiliary storage sites in a multi-target environment in preparation for a hyper exchange. Performing the hyper exchange includes detecting a failure with respect to a primary storage site in the multi-target environment; determining aggregate weights based on a management policy for each of the plurality of auxiliary storage sites; selecting an auxiliary storage site with a first aggregate weight from the plurality of auxiliary storage sites; and triggering the hyper exchange of a plurality of systems in a multi-target environment in response to the failure from the primary storage site to the auxiliary storage site with the first aggregate weight.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
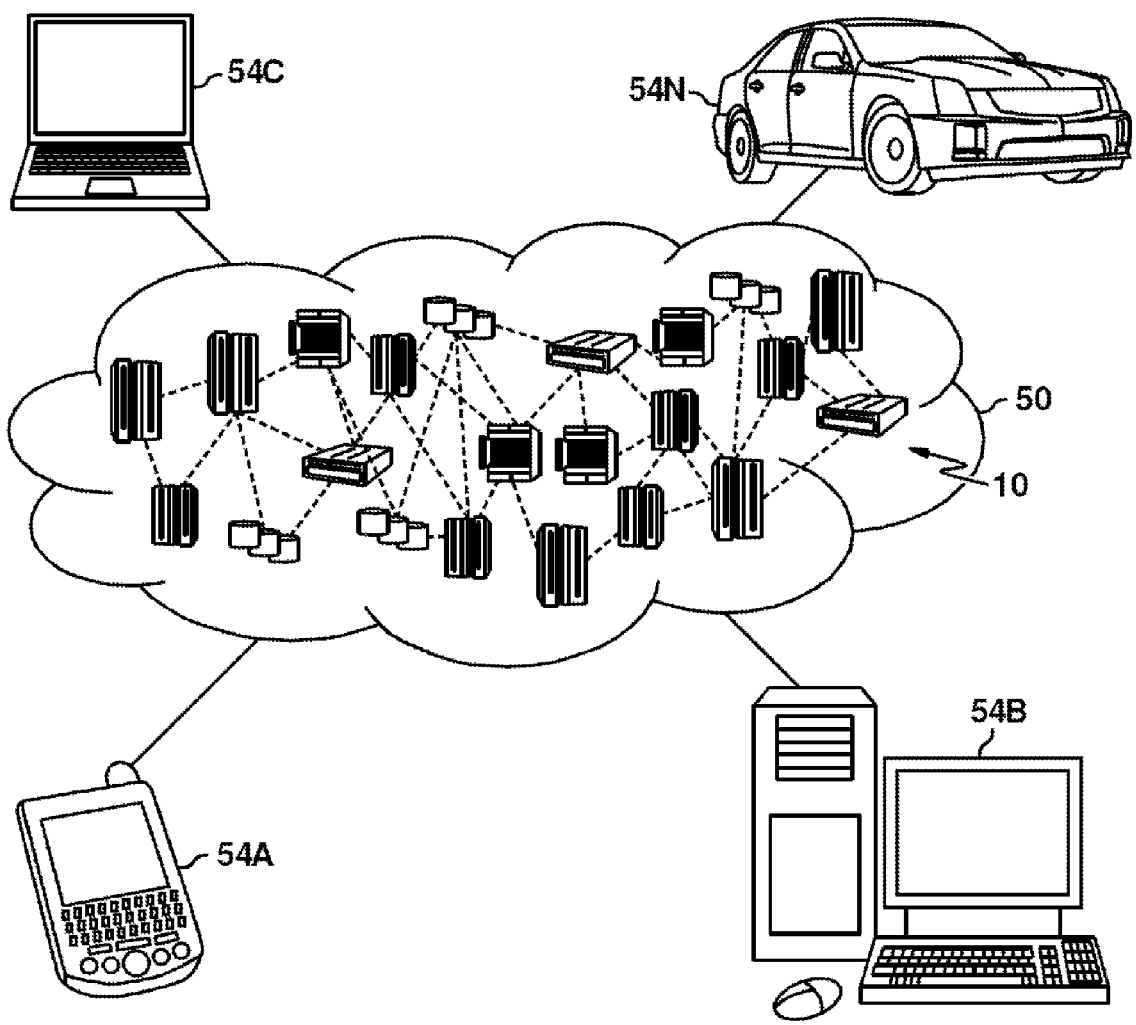
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
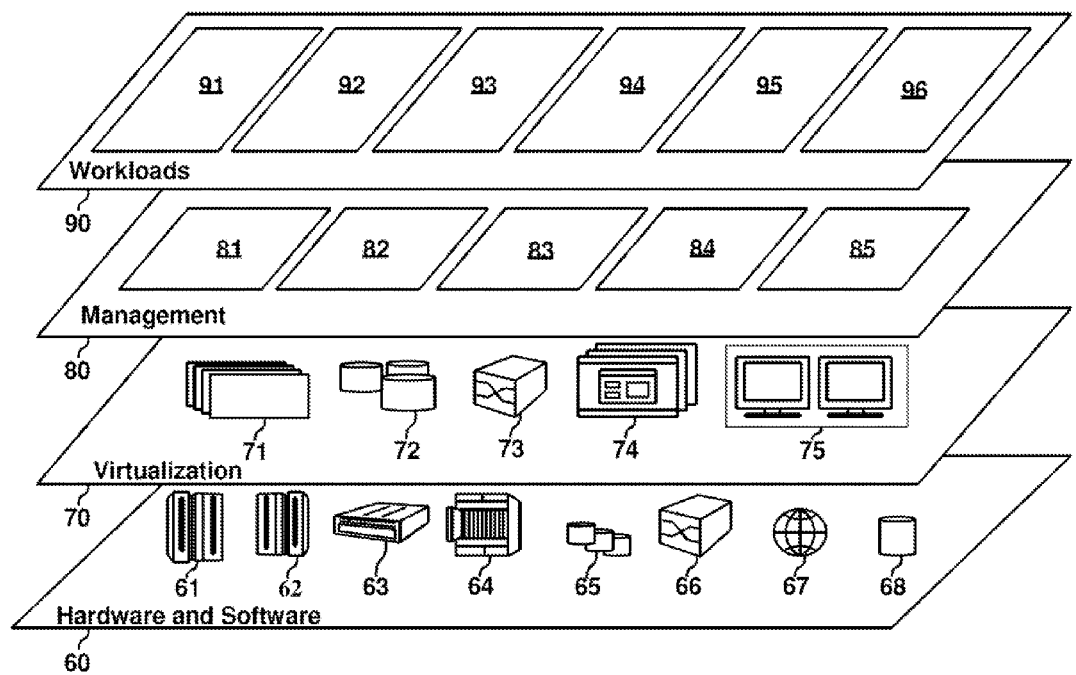
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In view of the above, embodiments described herein relate to multi-target environments and more specifically, to storage site selection in a multi-target environment using weights.

In general, the multi-target environment includes a plurality of targets that store duplicate images and one or more systems (such as a sysplex) that access an image on a primary target of the plurality of targets. A multi-target, as used herein, is a having multiple options to select therefrom (e.g., site 1 to site 2 and also site 1 to site 3), rather than a cascading replication (e.g., site 1 to site 2 to site 3. When a problem occurs with the primary target, the multi-target environment utilizes a computing facility to hyper exchange the access (by at least one of the plurality of systems) to that same image on a subsequent target. A hyper exchange, which can also be referred to as HyperSwap, is an enhanced selection and exchange operation in which the subsequent target selected from the plurality of targets based on a management policy, which considers the importance of each system. In this way, less important systems can be sacrificed so that the most important systems can continue to access that image, as duplicated on any subsequent target.

The plurality of targets can be a plurality of storage sites that includes a primary storage site and a plurality of subsequent (a.k.a. secondary or auxiliary) storage sites, each of which store the same image. The multi-target environment is configured to provide a mechanism to specify a management policy for which of the subsequent storage sites to hyper exchange to in the event that at least one system in the multi-target environment will be unable to access storage (no matter which site is swapped to). In this way, the multi-target environment is effective at factoring in a business impact of the hyper exchange decision to maximize the possibility of continuous availability for the most important applications, even after a failure that triggers a hyper exchange. Also, the multi-target environment is configured to enable a subsequent hyper exchange in the event that a first hyper exchange occurs or in the event that the first hyper exchange selects a subsequent storage site that is not operational. Thus, the multi-target environment can consider multiple system combinations when more than two systems exist in the multi-target environment, such that each combination can reflect a different business importance.

For example, the multi-target environment takes into consideration an importance of workloads running on systems within the multi-target environment when deciding whether and which system(s) should be sacrificed when a selecting storage site to swap to. To account for this importance, in an embodiment, the multi-target environment is configured to utilize a computing facility to define a weight for each system in a failure management policy (e.g., management policy as noted above).

The computing facility is a mechanism, which can be implemented through hardware, software, or combination thereof (such as in one of the computing nodes 10 described above), within the multi-target environment that implements the hyper exchange by designating weights and building the failure management policy. The weight identifies the important of each system in the multi-target environment, where importance can relate to an essentialness of a workload, a user defined importance based on customer metrics, etc. For example, if a credit card authorization workload is running on a system and it is therefore a business critical application, a high weight could be defined in the failure management policy for that system.

The failure management policy stores these weights and enables the calculation of an aggregate weight for each combination of systems within the multi-target environment. The computing facility can further store the aggregate weights in the failure management policy. The weights and the aggregate weights are utilized in case a failure occurs. In turn, the failure management policy enables a selection of a storage site for hyper exchange in the multi-target environment when the hyper exchange is triggered by providing the greatest total weight of each system, which reflects the greatest business value.

Furthermore, if two or more storage sites provide equal total weights (or greatest weight systems) then assigned priority of the storage site as defined in a priority protocol can be used as tie breaker, to select the storage site. The priority protocol can define an order in which to select a subsequent target based on, for example, a geographic location relative to the accessing sysplex. The priority protocol can be located within the failure management policy, a hyper exchange policy, or elsewhere in the sysplex. Thus, when a new access of the same image is needed and a storage site where all of the required systems are able to connect is not found, the computing facility can identify a subsequent storage site with a highest aggregate weight to provide that image, e.g., effectively allowing the systems providing a highest aggregate business value to survive.

Figure 3:
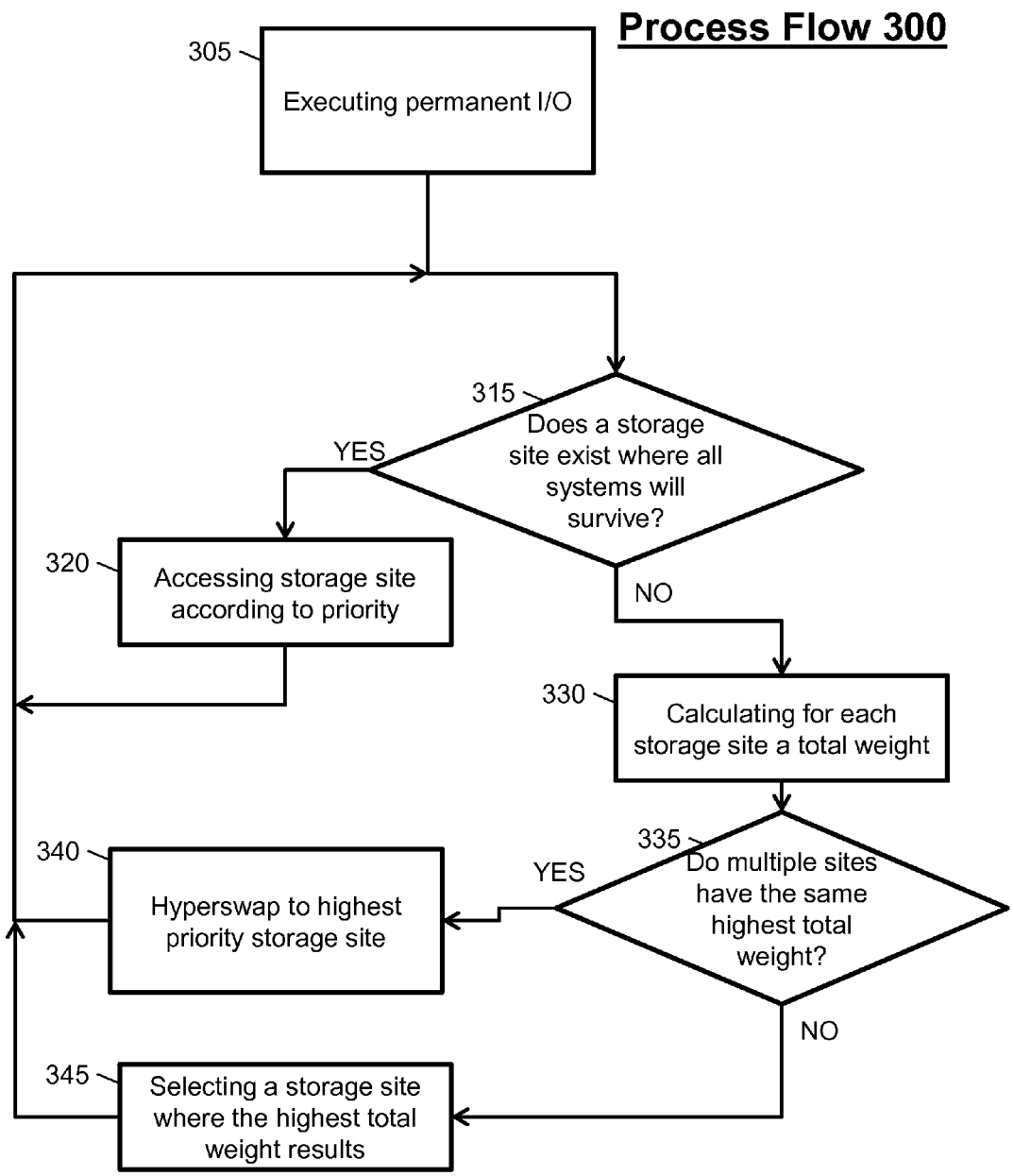
FIG. 3 depicts a process flow of a storage site selection in a multi-target environment in accordance with an embodiment.

Turning now to FIG. 3, a process flow 300 of a storage site selection in a multi-target environment is depicted in accordance with an embodiment. The process flow 300 is an approach utilizing failure management weights to select a storage site if a hyper exchange is triggered in the multi-target environment. Thus, the process flow 300 is an example of a hyper exchange processing performed in the virtualization layer 70 by a computing facility (as noted above) of the multi-target environment.

The process flow 300 begins at block 305, where the multi-target environment receives a permanent I/O error from a system (or systems) in a sysplex to a primary storage site. Then, in response to a failure with respect to the primary storage site, the hyper exchange is triggered. Next, in response to the triggered hyper exchange, the process flow 300 proceeds to decision block 315 where the multi-target environment determines if at least one subsequent storage site exists that can support all of the systems of the sysplex.

As indicated by the YES arrow, the process flow 300 will proceed to block 320 when it is determined that at least one subsequent storage site exists, which can support all of the systems of the sysplex. In turn, at block 320, the multi-target environment provides access to the at least one subsequent storage site for the sysplex. Note that if multiple subsequent storage sites can support the entire sysplex, than one of these multiple subsequent storage sites can be selected based on a priority protocol.

As indicated by the NO arrow, the process flow 300 will proceed to block 330 when it is determined that none of subsequent storage sites can support all of the systems of the sysplex. In turn, at block 330, the multi-target environment calculates which subsequent storage site provided the greatest total weight. That is, a total weigh is associated with each available subsequent storage site.

In one example, a storage site's hyper exchange viability can be determined today using a combination of factors. One factor in the determination can be the possibility of a successful hyper exchange for all systems based on accessibility to all of its secondary devices and a peer to peer remote copy status of its device pairs. Another factor in the determination can be a number of systems that may be impacted (removed) during the course of the hyper exchange. A system may be removed from the sysplex due to the current state of its configuration or due to a processing error that causes a system to fail during a phase of the hyper exchange sequence. Another factor in the determination can be which surviving systems are running the most business critical workloads. In this way, the computing facility can associate a total weight with each available subsequent storage site based on accessibility of the systems with most business critical workloads that will remain operational as a result of the hyper exchange.

Then, the computing facility of the multi-target environment can choose which subsequent storage site should be utilized by the hyper exchange. In this way, at decision block 335, the multi-target environment determines whether multiple available storage sites have the same highest total weight.

As indicated by the YES arrow, the process flow 300 will proceed to block 340 when it is determined that multiple available storage sites have the same highest total weight. In turn, at block 340, the multi-target environment provides access to the available storage sites based on the priority protocol (i.e., if the aggregate weights for two or more storage sites are both equal and the highest available, use the existing priority as the tie breaker).

As indicated by the NO arrow, the process flow 300 will proceed to block 345 when it is determined only one available storage site has the highest total weight. In turn, at block 340, the multi-target environment provides access to that available storage site.

Figure 4:
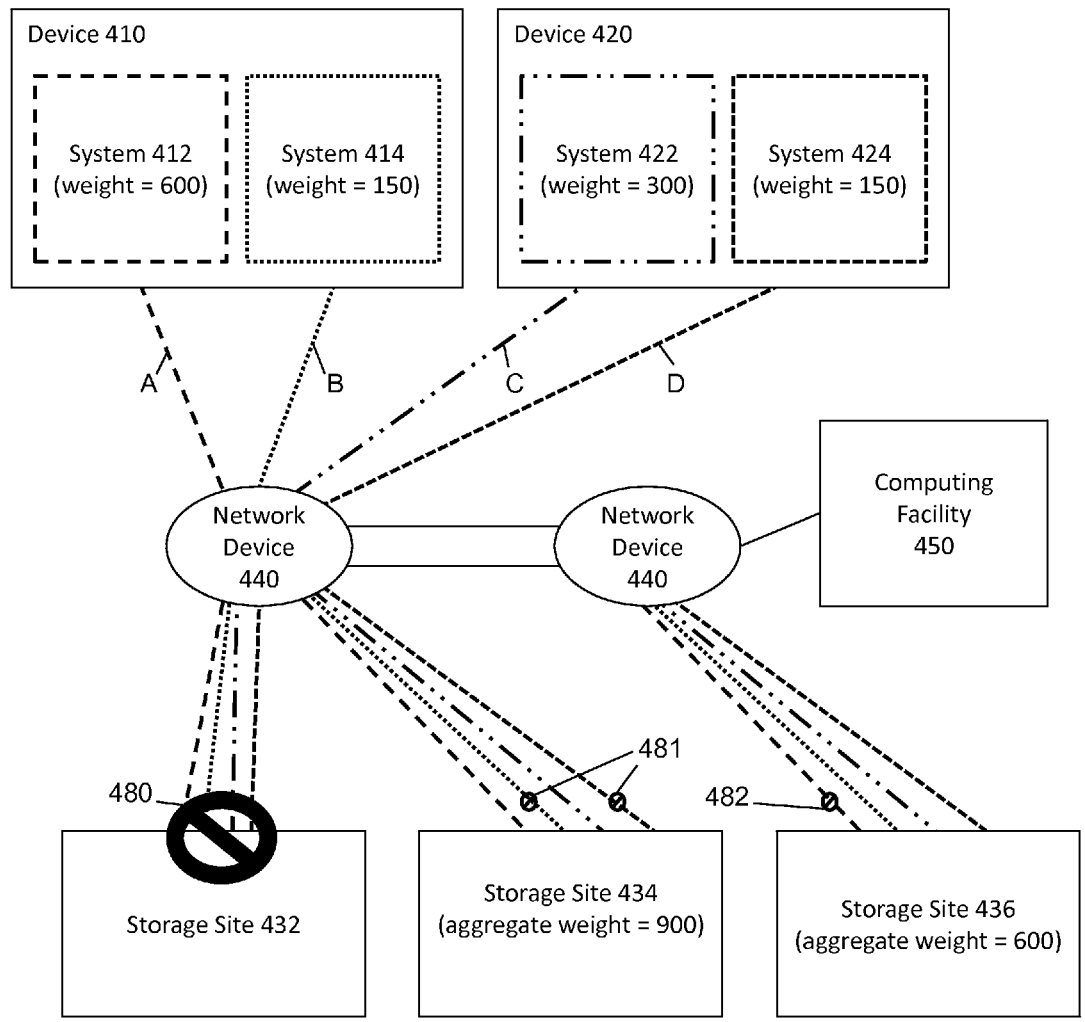
FIG. 4 depicts a schematic of a storage site selection in a multi-target environment in accordance with an embodiment.

FIG. 4 depicts a schematic of a storage site selection in a multi-target environment 400 in accordance with an embodiment. The multi-target environment 400 includes a physical server (e.g., device 410) that hosts systems 412 and 414 and a physical server (e.g., device 420) that hosts systems 422 and 424. These systems 412, 414, 422, and 424 are systems of a sysplex that access an image on the storage site 432 of the multi-target environment 400. This image is duplicated across storage sites 434 and 436 of the multi-target environment 400. Access for the systems 412, 414, 422, and 424 is respectively provided via connections A, B, C, and D through the network devices 440 of the multi-target environment 400.

In an embodiment, physical servers (410 and 420) can be logically partitioned to allow more than one system to run on them through logical partitions and/or virtual machine ware (e.g., systems 412, 414, 422, and 424). Connections A and B illustrate two physical paths from the physical server (410) to the network device 440, both of which are available to systems 412 and 414. Similarly, connections C and D illustrate two physical paths from the physical server (420) to the network device 440, both of which are available to systems 422 and 424. Control blocks in each of the systems 412, 414, 422 and 424 can define access to storage sites 432, 434 and 436. A hyper exchange can, in turn, be performed by switching information for an active unit control block (for storage site 432) with target unit control block (for storage sites 434 or 436), and thereby causing all subsequent I/O requests to that target unit control block to be directed to the selected target.

This access may be controlled by a computing facility 450 (a computing facility as described above) of the multi-target environment 400, as a separate device or as executed on one or more systems 412, 414, 422, and 424. The computing facility 450 can be configured as a peer-to-peer relationship, with one of the systems 412, 414, 422, and 424 assuming a 'master' role. The computing facility 450 can be configured to assign a weight to each of the system 412, 414, 422, and 424. As shown in FIG. 4, the system 412 has a weight equal to 600, the system 414 has a weight equal to 150, the system 422 has a weight equal to 300, and the system 424 has a weight equal to 150. Note that the higher weights of systems 412 and 422 reflect the business criticalness of their workloads.

In operation, when the storage site 432 is unavailable or fails (as indicated by the 'No Symbol' 480), the computing facility 450 calculates a total or aggregate weight for each storage site 434, 436. As shown in FIG. 4, the storage site 434 has an aggregate weight equal to 900 based on the weights of the systems 412 and 422, because only the systems 412 and 422 will survive a hyper exchange to the storage site 434 (as indicated by the 'No Symbols' 481). Further, the storage site 436 has an aggregate weight equal to 600 based on the weights of the systems 414, 422 and 424, because only the systems 414, 422 and 424 will survive a hyper exchange to the storage site 436 (as indicated by the 'No Symbols' 482). Thus, while more systems will survive if the storage site 436 is selected, the computing facility 450 selects the storage site 434 because the aggregate weight of 900 is greater than 600.

Figure 5:
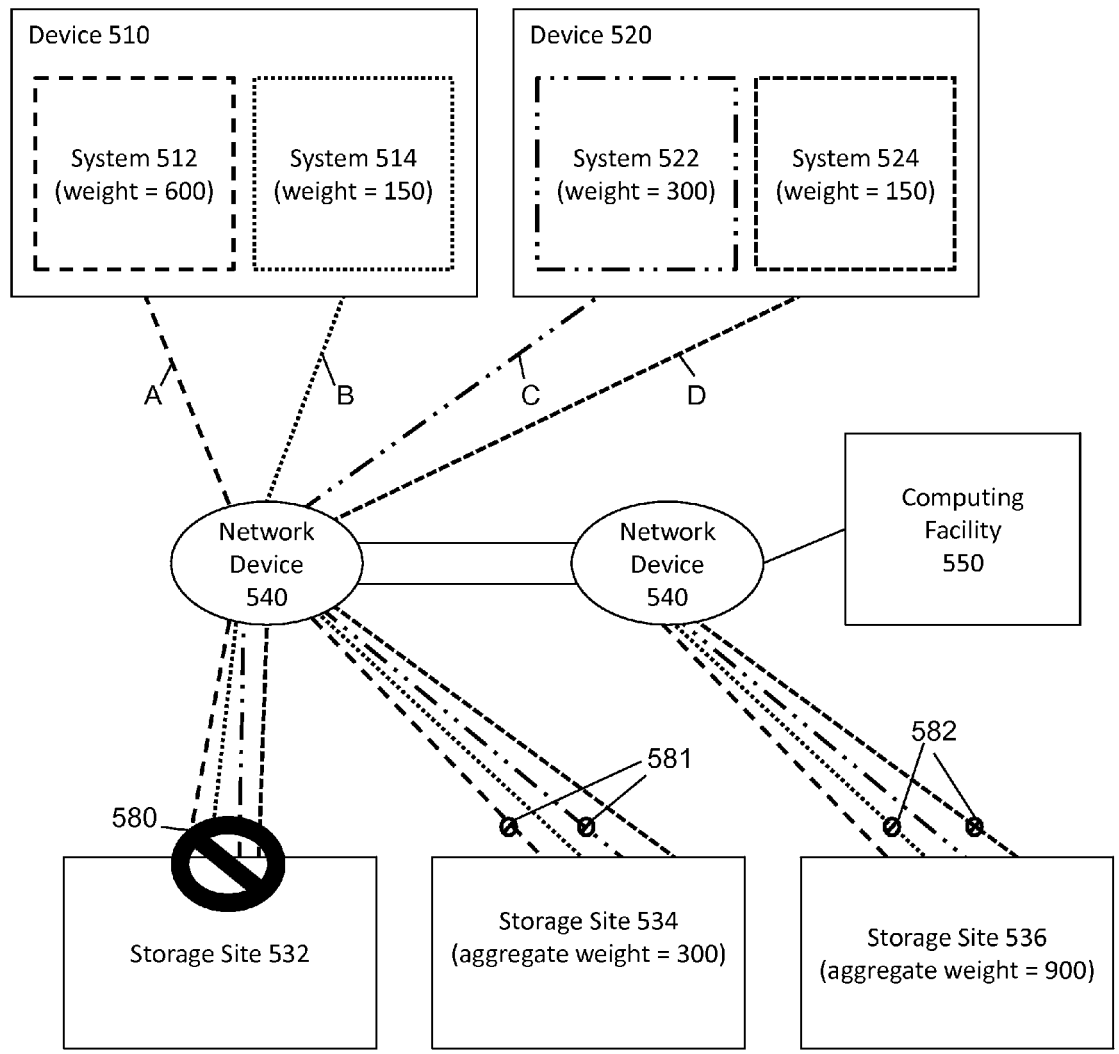
FIG. 5 depicts another schematic of a storage site selection in a multi-target environment in accordance with an embodiment.

FIG. 5 depicts a schematic of a storage site selection in a multi-target environment 500 in accordance with an embodiment. The multi-target environment 500 includes a physical server (e.g., device 510) that hosts systems 512 and 514 and a physical server (e.g., device 520) that hosts systems 522 and 524. These systems 512, 514, 522, and 524 are systems of a sysplex that access an image on the storage site 532 of the multi-target environment 500. This image is duplicated across storage sites 534 and 536 of the multi-target environment 500. Access for the systems 512, 514, 532, and 524 is respectively provided via connections A, B, C, and D through the network devices 540 of the multi-target environment 500.

This access is controlled by a computing facility 550 of the multi-target environment 500. The computing facility 550 is configured to assign a weight to each of the system 512, 514, 522, and 524. As shown in FIG. 5, the system 512 has a weight equal to 600, the system 514 has a weight equal to 150, the system 522 has a weight equal to 300, and the system 524 has a weight equal to 150. Note that the higher weights of systems 512 and 522 reflect the business criticalness of their workloads.

In operation, when the storage site 532 is unavailable or fails (as indicated by the 'No Symbol' 580), the computing facility 550 calculates a total or aggregate weight for each storage site 534, 536. As shown in FIG. 5, the storage site 534 has an aggregate weight equal to 300 based on the weights of the systems 514 and 524, because only the systems 514 and 524 will survive a hyper exchange to the storage site 534 (as indicated by the 'No Symbols' 581). Further, the storage site 536 has an aggregate weight equal to 900 based on the weights of the systems 512 and 522, because only the systems 512 and 522 will survive a hyper exchange to the storage site 536 (as indicated by the 'No Symbols' 582). Thus, while both storage sites 534 and 536 will cause the same amount of systems of the sysplex to survive, the computing facility 550 selects the storage site 536 because the aggregate weight of 900 is greater than 300.

Technical effects and benefits of the embodiments herein includes considering an importance of each system in a multi-target environment when selecting a storage site for a hyper exchange. Thus, embodiments described herein are necessarily rooted in computing facility to perform proactive operations to overcome problems specifically arising in the realm of selecting a storage site for a hyper exchange in multi-target environments (e.g., these problems include failed switch ports on switches (440) or failed host adapters on storage devices at storage sites 434 or 436 resulting in the inability to access data). For example, while contemporary implementations are non-optimal, the embodiments herein will calculate the aggregate weights of the sysplex using the weights defined in a failure management policy and use this policy to select a target when a hyper exchange is triggered in a multi-target environment and the environment is such that no target provides access for all members of the sysplex.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing a selection of a plurality of auxiliary storage sites in a multi-target environment in preparation for a hyper exchange, comprising:
   detecting, by a computing facility comprising a processor and a memory, a failure with respect to a primary storage site in the multi-target environment;
   determining, by the computing facility, aggregate weights based on a management policy for each of the plurality of auxiliary storage sites;
   selecting, by the computing facility, an auxiliary storage site with a first aggregate weight from the plurality of auxiliary storage sites; and
   in response to the failure with respect to a primary storage site, triggering, by the computing facility, the hyper exchange of a plurality of systems in a multi-target environment from the primary storage site to the auxiliary storage site with the first aggregate weight,
   wherein the computing facility is configured to enable a subsequent hyper exchange between the primary storage site and the auxiliary storage site with the first aggregate weight,
   wherein the first aggregate weight is a highest aggregate weight, and wherein the computing facility is configured to enable another subsequent hyper exchange between the auxiliary storage site and another auxiliary storage site with a next highest aggregate weight when a subsequent failure with respect to the auxiliary storage site of the multi-target environment is detected.

2. The method of claim 1, further comprising:
   determining that there is no viable target site in the multi-target environment where all systems can access all volumes.

3. The method of claim 1, further comprising:
   determining that one of the plurality of auxiliary storage sites can support all of the plurality of systems in a multi-target environment; and
   triggering the hyper exchange of the plurality of systems from the primary storage site to the one of the plurality of auxiliary storage sites in response to the failure.

4. The method of claim 1, further comprising:
   determining that two or more of the plurality of auxiliary storage sites are associated with the first aggregate weight; and
   selecting an auxiliary storage site with a highest priority based on the management policy from the two or more of the plurality of auxiliary storage sites.

5. The method of claim 1, wherein each aggregate weight is based on a number of the plurality of systems that are impacted during the hyper exchange.

6. A computer program product, the computer program product comprising a computer readable storage medium having program instructions for performing a selection of a plurality of auxiliary storage sites in a multi-target environment in preparation for a hyper exchange embodied therewith, the program instructions executable by a processor to cause the processor to perform:
   detecting a failure with respect to a primary storage site in the multi-target environment;
   determining aggregate weights based on a management policy for each of the plurality of auxiliary storage sites;
   selecting an auxiliary storage site with a first aggregate weight from the plurality of auxiliary storage sites; and
   in response to the failure with respect to a primary storage site, triggering the hyper exchange of a plurality of systems in a multi-target environment from the primary storage site to the auxiliary storage site with the first aggregate weight,
   wherein the computing facility is configured to enable a subsequent hyper exchange between the auxiliary storage site with the first aggregate weight,
   wherein the first aggregate weight is a highest aggregate weight, and
   wherein the computing facility is configured to enable another subsequent hyper exchange between the primary storage site and the auxiliary storage site and another auxiliary storage site with a next highest aggregate weight when a subsequent failure with respect to the auxiliary storage site of the multi-target environment is detected.

7. The computer program product of claim 6, the program instructions further executable by the processor to cause the processor to perform:
determining that there is no viable target site in the multi-target environment where all systems can access all volumes.

8. The computer program product of claim 6, the program instructions further executable by the processor to cause the processor to perform:
determining that one of the plurality of auxiliary storage sites can support all of the plurality of systems in a multi-target environment; and
triggering the hyper exchange of the plurality of systems from the primary storage site to the one of the plurality of auxiliary storage sites in response to the failure.

9. The computer program product of claim 6, the program instructions further executable by the processor to cause the processor to perform:
determining that two or more of the plurality of auxiliary storage sites are associated with the first aggregate weight; and
selecting an auxiliary storage site with a highest priority based on the management policy from the two or more of the plurality of auxiliary storage sites.

10. The computer program product of claim 6, wherein each aggregate weight is based on a number of the plurality of systems that are impacted during the hyper exchange.

11. A system for performing a selection of a plurality of auxiliary storage sites in a multi-target environment in preparation for a hyper exchange, the system comprising:
a memory having computer readable instructions; and
a processor for executing the computer readable instructions, the computer readable instructions including:
detecting a failure with respect to a primary storage site in the multi-target environment;
determining aggregate weights based on a management policy for each of the plurality of auxiliary storage sites;
selecting an auxiliary storage site with a first aggregate weight from the plurality of auxiliary storage sites; and
in response to the failure with respect to a primary storage site, triggering the hyper exchange of a plurality of systems in a multi-target environment from the primary storage site to the auxiliary storage site with the first aggregate weight,
wherein the computing facility is configured to enable a subsequent hyper exchange between the primary storage site and the auxiliary storage site with the first aggregate weight,
wherein the first aggregate weight is a highest aggregate weight, and
wherein the computing facility is configured to enable another subsequent hyper exchange between the auxiliary storage site and another auxiliary storage site with a next highest aggregate weight when a subsequent failure with respect to the auxiliary storage site of the multi-target environment is detected.

12. The system of claim 11, wherein the computer readable instructions further comprise:
determining that there is no viable target site in the multi-target environment where all systems can access all volumes.

13. The system of claim 11, wherein the computer readable instructions further comprise:
determining that one of the plurality of auxiliary storage sites can support all of the plurality of systems in a multi-target environment; and
triggering the hyper exchange of the plurality of systems from the primary storage site to the one of the plurality of auxiliary storage sites in response to the failure.

14. The system of claim 11, wherein the computer readable instructions further comprise:
determining that two or more of the plurality of auxiliary storage sites are associated with the first aggregate weight; and
selecting an auxiliary storage site with a highest priority based on the management policy from the two or more of the plurality of auxiliary storage sites.

* * * * *